United States Patent
Kobayashi

(10) Patent No.: US 10,523,836 B2
(45) Date of Patent: Dec. 31, 2019

(54) INFORMATION PROCESSING APPARATUS

(71) Applicant: KYOCERA Document Solutions Inc., Osaka (JP)

(72) Inventor: Shinya Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/273,838

(22) Filed: Feb. 12, 2019

(65) Prior Publication Data

US 2019/0260898 A1 Aug. 22, 2019

(30) Foreign Application Priority Data

Feb. 22, 2018 (JP) ................................. 2018-030023

(51) Int. Cl.
*G06F 3/12* (2006.01)
*H04N 1/00* (2006.01)

(52) U.S. Cl.
CPC ......... *H04N 1/00965* (2013.01); *G06F 3/122* (2013.01); *G06F 3/1267* (2013.01); *G06F 3/1274* (2013.01)

(58) Field of Classification Search
None
See application file for complete search history.

(56) References Cited

U.S. PATENT DOCUMENTS

2016/0371025 A1* 12/2016 Park ....................... G06F 3/0659
2018/0024533 A1* 1/2018 Zhou ....................... G06F 13/00
711/103

FOREIGN PATENT DOCUMENTS

JP 2001-265191 A 9/2001

* cited by examiner

*Primary Examiner* — Huo Long Chen
(74) *Attorney, Agent, or Firm* — Stein IP, LLC

(57) ABSTRACT

An information processing apparatus includes an optional device, a main body processing portion, a first buffer, and a second buffer. When brought into a state where control data cannot be retained in an optional memory, the optional device transmits a saving request to the main body processing portion, and when brought into a state where the control data can be retained, the optional device transmits a saving cancel request to the main body processing portion. In a time period from the time of receipt of the saving request to the time of receipt of the saving cancel request, the main body processing portion saves specific control data to the second buffer, and after receipt of the saving cancel request, transmits the specific control data to the optional device.

5 Claims, 6 Drawing Sheets

WHEN MEMORY FULL STATE IS NOT ESTABLISHED

WHEN MEMORY FULL STATE IS ESTABLISHED

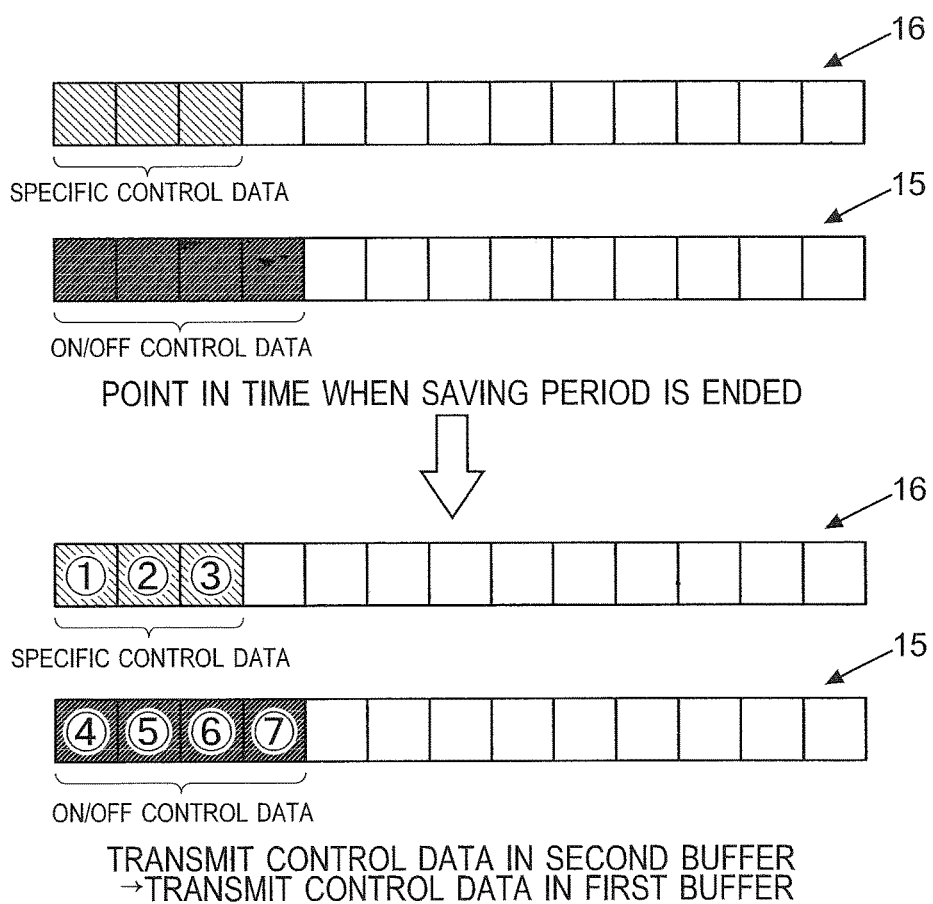

INFORMATION PROCESSING APPARATUS

INCORPORATION BY REFERENCE

This application is based upon and claims the benefit of priority from the corresponding Japanese Patent Application No. 2018-030023 filed on Feb. 22, 2018, the contents of which are incorporated herein by reference.

BACKGROUND

The present disclosure relates to an information processing apparatus provided with an optional device.

An information processing apparatus such as an image forming apparatus is configured so that an optional device is mountable thereto. For example, there is known an information processing apparatus to which a post-processing device or a paper feed device is mounted as an optional device.

Typically, an information processing apparatus includes a main body processing portion that performs entire control of the information processing apparatus. In a case where an optional device is mounted to the information processing apparatus, the main body processing portion communicates with an optional processing portion provided in the optional device and controls the optional device.

SUMMARY

An information processing apparatus of the present disclosure includes an optional device, a main body processing portion, a first buffer, and a second buffer. The main body processing portion transmits control data for controlling the optional device to the optional device. The first buffer primarily stores the control data to be transmitted to the optional device. The optional device includes an optional memory. When brought into a state where the control data cannot be retained in the optional memory, the optional device transmits a saving request to the main body processing portion, and when brought into a state where the control data can be retained in the optional memory, the optional device transmits a saving cancel request to the main body processing portion. In a time period from the time of receipt of the saving request to the time of receipt of the saving cancel request, for specific control data that is a type of control data required to be retained in the optional memory, the main body processing portion saves the specific control data from the first buffer to the second buffer without transmitting the specific control data to the optional device, while for any other type of control data than the specific control data, the main body processing portion transmits the any other type of control data from the first buffer to the optional device and, after receipt of the saving cancel request, transmits the specific control data, which has been saved to the second buffer, to the optional device.

BRIEF DESCRIPTION OF THE DRAWINGS

FIG. 7 is a view for explaining an order in which pieces of the control data are transmitted to the post-processing device by the main body CPU of the image forming apparatus according to one embodiment of the present disclosure.

DETAILED DESCRIPTION

The following describes an image forming apparatus as an example of an information processing apparatus according to one embodiment of the present disclosure.

<Configuration of Image Forming Apparatus>

Figure 1:
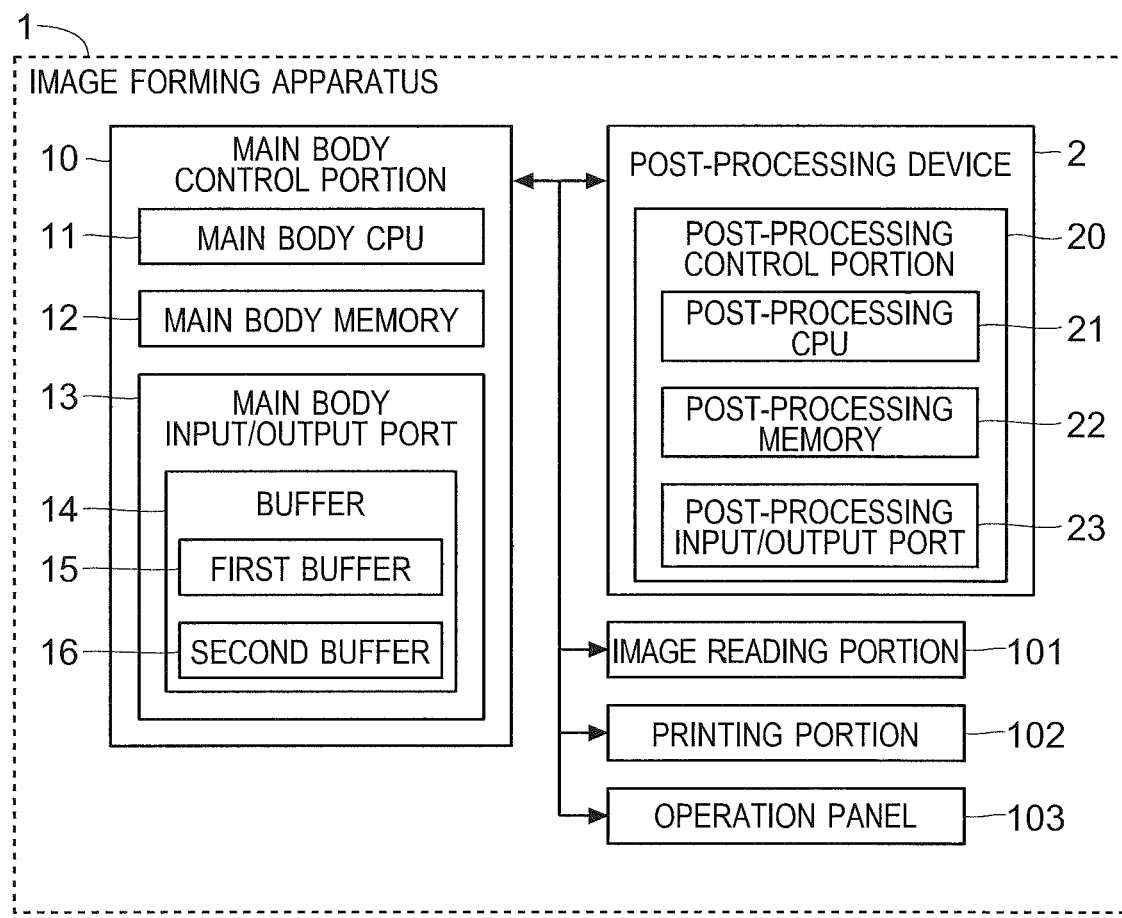
FIG. 1 is a block diagram showing a configuration of an image forming apparatus according to one embodiment of the present disclosure.

As shown in FIG. 1, an image forming apparatus 1 of this embodiment includes an image reading portion 101 and a printing portion 102. The image reading portion 101 reads an original document and generates image data of the original document. The printing portion 102 feeds a sheet to a sheet conveyance path and conveys the sheet along the sheet conveyance path. Furthermore, based on image data (such as the image data of the original document read by the image reading portion 101), the printing portion 102 forms a toner image. Then, the printing portion 102 prints the toner image on the sheet being conveyed. That is, the image forming apparatus 1 is capable of executing a job involving reading of an original document and printing of an image on a sheet. In a case where a user terminal (such as a personal computer) is connected to the image forming apparatus 1, the image forming apparatus 1 can be used as a printer.

In order to accept a job-related setting from a user, the image forming apparatus 1 includes an operation panel 103. The operation panel 103 is provided with a touch screen. The touch screen displays software buttons and accepts a job-related setting. The operation panel 103 is provided also with hardware buttons. Examples of the hardware buttons include a start button for accepting an instruction to execute a job from a user. In a case where the image forming apparatus 1 is used as a printer, an instruction to execute a job is provided from a user terminal.

The image forming apparatus 1 also includes a main body control portion 10. The main body control portion 10 controls various portions in a main body of the image forming apparatus 1, such as the image reading portion 101 and the printing portion 102. Furthermore, to an after-mentioned post-processing device 2, the main body control portion 10 transmits control data (a command) for controlling the post-processing device 2.

The main body control portion 10 is, for example, a microcomputer and includes a main body CPU 11, a main body memory 12, and a main body input/output port 13. The main body CPU 11, the main body memory 12, and the main body input/output port 13 are connected to each other via a bus. The main body CPU 11 operates based on control software and performs processes for controlling the image forming apparatus 1. The main body CPU 11 corresponds to a "main body processing portion."

The main body memory 12 includes a non-volatile memory (a ROM) and a volatile memory (a RAM). The main body memory 12 stores control software for operating the main body CPU 11. The main body CPU 11 reads data from the main body memory 12 and writes data into the main body memory 12.

Data is inputted/outputted through the main body input/output port 13. The main body input/output port 13 includes, as a data output buffer 14, a first buffer 15 and a second buffer 16. For example, a drive circuit for a motor and a clutch installed in each of the image reading portion 101 and the printing portion 102, a sensor, and so on are connected to the main body input/output port 13.

Here, the image forming apparatus 1 includes the post-processing device 2. The post-processing device 2 has a plurality of discharge trays. The post-processing device 2 performs post-processing such as a punching process or a stapling process with respect to a sheet on which an image has been printed by the printing portion 102. Then, the post-processing device 2 discharges the thus post-processed sheet onto any of the discharge trays. The post-processing device 2 corresponds to an "optional device."

The post-processing device 2 includes a post-processing control portion 20. The post-processing control portion 20 is communicably connected to the main body control portion 10. The post-processing control portion 20 receives control data (a command) from the main body control portion 10 and, based on said control data thus received, controls the post-processing device 2.

The post-processing control portion 20 is, for example, a microcomputer and includes a post-processing CPU 21, a post-processing memory 22, and a post-processing input/output port 23. The post-processing CPU 21, the post-processing memory 22, and the post-processing input/output port 23 are connected to each other via a bus. The post-processing CPU 21 operates based on control software and performs processes for controlling the post-processing device 2.

The post-processing memory 22 includes a non-volatile memory (a ROM) and a volatile memory (a RAM). The post-processing memory 22 stores control software for operating the post-processing CPU 21. The post-processing CPU 21 reads data from the optional memory 22 and writes data into the optional memory 22. The post-processing memory 22 corresponds to an "optional memory."

Data is inputted/outputted through the post-processing input/output port 23. For example, a drive circuit for a motor and a clutch installed in the post-processing device 2, the sensor, and so on are connected to the post-processing input/output port 23. The main body control portion 10 is also connected to the post-processing input/output port 23.

<Control Performed when Job is Executed>

Upon the image forming apparatus 1 receiving an instruction to execute a job, the main body CPU 11 hierarchically performs processes related to the job. For example, the main body CPU 11 performs various processes including a process of recognizing set contents set by a user, a process of detecting, based on an output value of the sensor, a status of the image forming apparatus 1 (a process of detecting a sheet residual amount, a toner residual amount, or the like), a process of controlling, based on the set contents set by the user, the image reading portion 101 or the printing portion 102 (for example, a process of controlling sheet feeding and conveyance or toner image formation), and so on.

The main body CPU 11 also performs a process of recognizing a status of the post-processing device 2, a process of generating control data (a command) to be transmitted to the post-processing device 2, and so on. Further, as a process at a lowermost hierarchical level, the main body CPU 11 performs a process of transmitting the control data (the command) generated in the process at a higher hierarchical level to the post-processing device 2.

Figure 2:
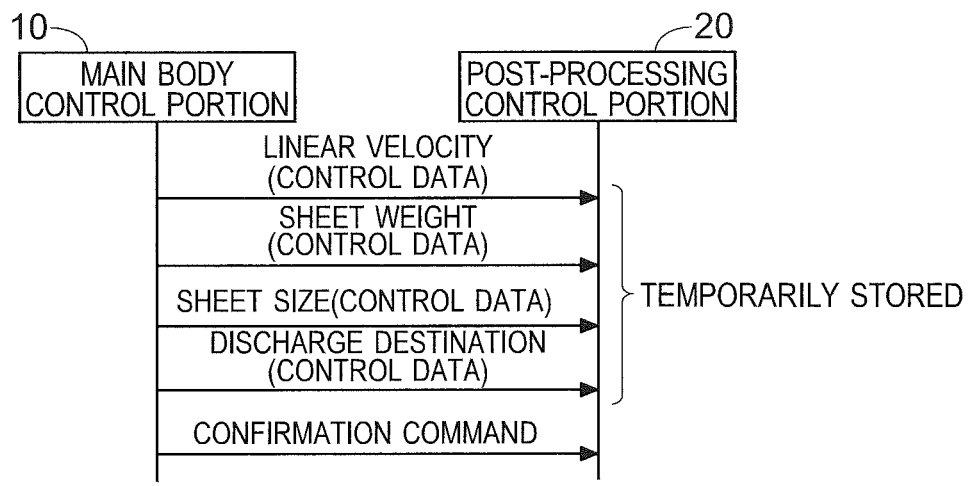
FIG. 2 is a view showing types of control data transmitted to a post-processing device by a main body CPU of the image forming apparatus according to one embodiment of the present disclosure.

For example, as shown in FIG. 2, various types of control data such as control data related to a linear velocity, control data related to a sheet weight, control data related to a sheet size, and control data related to a discharge destination may be transmitted to the post-processing device 2.

The control data transmitted to the post-processing device 2 is temporarily retained in the RAM of the post-processing memory 22. After transmitting the control data to the post-processing device 2, the main body CPU 11 transmits a confirmation command to the post-processing device 2.

Upon receipt of the confirmation command, based on the control data retained in the post-processing memory 22, the post-processing CPU 21 performs a setting process of setting (changing) a set value of a setting item related to a post-processing setting. Upon completion of the setting process, the post-processing CPU 21 erases the control data retained in the post-processing memory 22 from the post-processing memory 22.

In a case of executing a job in which an image is printed consecutively on each of a plurality of sheets (in a case where the plurality of sheets are consecutively fed to the sheet conveyance path), every time each of the plurality of sheets is fed to the sheet conveyance path, the main body CPU 11 determines whether or not set contents of a post-processing setting should be changed. In a case where, as a result, it is determined that the set contents of the post-processing setting should be changed, the main body CPU 11 transmits control data to the post-processing device 2 and then transmits a confirmation command to the post-processing device 2.

Specifically, in feeding a first one of the plurality of sheets, the main body CPU 11 transmits control data to the post-processing device 2 and then transmits a confirmation command to the post-processing device 2. Further, in feeding a second or any subsequent one of the plurality of sheets, when there is no change in any of a linear velocity, a sheet weight, a sheet size, and a discharge destination, control data is not transmitted from the main body CPU 11 to the post-processing device 2. On the other hand, when there is a change in any of a linear velocity, a sheet weight, a sheet size, and a discharge destination, the main body CPU 11 transmits control data to the post-processing device 2 and then transmits a confirmation command to the post-processing device 2. For example, in a case where there is no change in any of a linear velocity, a sheet weight, and a sheet size and there is a change in discharge destination, the main body CPU 11 transmits only the control data related to a discharge destination (data indicating a new discharge destination after the change) to the post-processing device 2 and then transmits a confirmation command to the post-processing device 2. In this case, a discharge destination of a post-processed sheet is changed. That is, with respect to a discharge tray onto which a preceding sheet has been discharged, a succeeding sheet is discharged onto a discharge tray different therefrom.

Furthermore, for example, control data related to an on/off of the motor and the clutch installed in the post-processing device 2 may also be transmitted to the post-processing device 2. In a case of switching an on/off of the motor and the clutch in the post-processing device 2, the main body CPU 11 transmits the control data related to an on/off of the motor and the clutch to the post-processing device 2. Upon receipt of the control data related to an on/off of the motor and the clutch, based on said control data, the post-processing CPU 21 immediately switches an on/off of the motor and the clutch in the post-processing device 2 without retaining said control data in the post-processing memory 22.

In a description below, control data required to be retained in the post-processing memory 22 may be referred to as specific control data. The control data related to a linear velocity, the control data related to a sheet weight, the control data related to a sheet size, the control data related to a discharge destination, and so on correspond to the specific control data. On the other hand, control data not required to be retained in the post-processing memory 22, namely, the control data related to an on/off of the motor and the clutch may be referred to as on/off control data.

<Saving of Control Data>

When performing the process of transmitting control data to the post-processing device 2 (the process at the lowermost hierarchical level), the main body CPU 11 primarily stores, in the buffer 14, the control data generated in the process at the higher hierarchical level. Then, the main body CPU 11 transmits the control data primarily stored in the buffer 14 to the post-processing device 2.

Here, in a case where a plurality of pieces of specific control data are consecutively transmitted to the post-processing device 2, the RAM of the post-processing memory 22 may be brought into a memory full state (a state where the specific control data cannot be retained). When the post-processing memory 22 is in such a memory full state, a piece of specific control data transmitted to the post-processing device 2 will not be retained in the post-processing memory 22. This case might lead to occurrence of an inconvenience in which a job is executed in a state where a setting process based on the piece of specific control data transmitted to the post-processing device 2 has not been performed (a state where data leakage has occurred).

Figure 3:
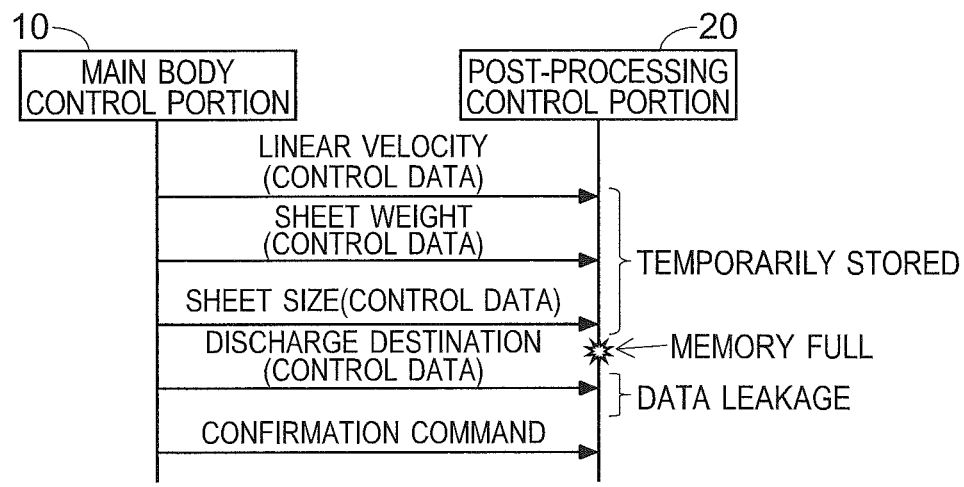
FIG. 3 is a view for explaining data leakage.

For example, it is assumed that, as shown in FIG. 3, the control data related to a linear velocity, the control data related to a sheet weight, and the control data related to a sheet size are sequentially transmitted to the post-processing device 2, and transmitting the control data related to a sheet size to the post-processing device 2 has brought the post-processing memory 22 into a memory full state. It is further assumed that when and after the memory full state of the post-processing memory 22 has been reached, the control data related to a discharge destination is transmitted to the post-processing device 2 and then a confirmation command is transmitted to the post-processing device 2.

In this example, the control data related to a discharge destination is not retained in the post-processing memory 22 (data leakage occurs). This brings about a state where, at a point in time when the confirmation command is transmitted to the post-processing device 2, the control data related to a discharge destination has not been retained in the post-processing memory 22. As a result, a discharge destination of a post-processed sheet is not changed. That is, with respect to a discharge tray onto which a preceding sheet has been discharged, a succeeding sheet is undesirably discharged onto the same discharge tray.

To avoid this, when a memory full state of the post-processing memory 22 is reached (when there is reached a state where the specific control data cannot be retained in the post-processing memory 22), the post-processing CPU 21 transmits a saving request to the main body CPU 11. In a case where a memory full state of the post-processing memory 22 is resolved when and after the memory full state of the post-processing memory 22 has been reached, the post-processing CPU 21 transmits a saving cancel request to the main body CPU 11. Based on the saving request (the saving cancel request) received from the post-processing CPU 21, the main body CPU 11 determines whether or not the post-processing memory 22 is in a memory full state.

Figure 4:
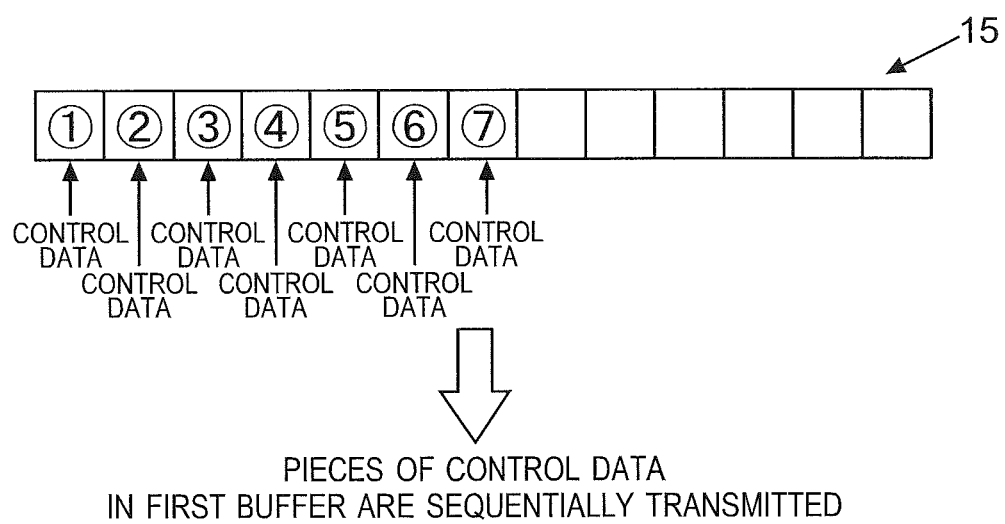
FIG. 4 is a conceptual view showing a state where control data is stored in a first buffer of the image forming apparatus according to one embodiment of the present disclosure.

In a case where the post-processing memory 22 is not in a memory full state, as one process step of the process at the lowermost hierarchical level, the main body CPU 11 performs a process of primarily storing, in the first buffer 15, control data generated in the process at the higher hierarchical level. FIG. 4 shows a conceptual view of the first buffer 15 storing control data. FIG. 4 assumes that seven pieces of control data are stored in the first buffer 15. In FIG. 4, numbers 1 to 7 are assigned to the pieces of control data (said numbers indicate an order in which the pieces of control data are to be transmitted). After the pieces of control data have been stored in the first buffer 15, the main body CPU 11 sequentially acquires the pieces of control data stored in the first buffer 15. Then, the main body CPU 11 sequentially transmits the pieces of control data to the post-processing device 2. The main body CPU 11 transmits the pieces of control data one by one to the post-processing device 2 at prescribed timing (timing at which transmission of the pieces of control data to the post-processing device 2 is enabled).

In a case where the post-processing memory 22 is in a memory full state, as one process step of the process at the lowermost hierarchical level, the main body CPU 11 performs, in addition to the process of primarily storing, in the first buffer 15, control data generated in the process at the higher hierarchical level, a saving process of saving the specific control data from the first buffer 15 to the second buffer 16 (a process of primarily storing the specific control data in the second buffer 16). In other words, upon receipt of a saving request from the post-processing CPU 21, the main body CPU 11 makes a transition to a saving mode in which the saving process is performed.

The saving process is performed by the main body CPU 11, and thus among the pieces of control data stored in the first buffer 15, specific control data is saved to the second buffer 16. During a saving period that is a period in which the main body CPU 11 is in the saving mode, the specific control data is not transmitted to the post-processing device 2. Even during the saving period, however, the on/off control data is transmitted to the post-processing device 2.

Upon receipt of a saving cancel request from the post-processing CPU 21 when and after the transition has been made to the saving mode, the main body CPU 11 ends the saving mode (the saving period is ended). That is, the saving period refers to a time period from the time of receipt of a saving request to the time of receipt of a saving cancel request. With the saving period ended, the main body CPU 11 does not perform the saving process.

In a case where the specific control data has been stored in the second buffer 16 when the saving period is ended (when a saving cancel request is received from the post-processing CPU 21), the main body CPU 11 preferentially transmits the specific control data stored in the second buffer 16 to the post-processing device 2. For example, it is assumed that, at a point in time when the saving period is ended, the control data related to a discharge destination has been stored in the second buffer 16. In this case, even when any other type of control data is stored in the first buffer 15, the main body CPU 11 first transmits the control data related to a discharge destination stored in the second buffer 16 to the post-processing device 2 and then transmits a confirmation command to the post-processing device 2.

Figure 5:
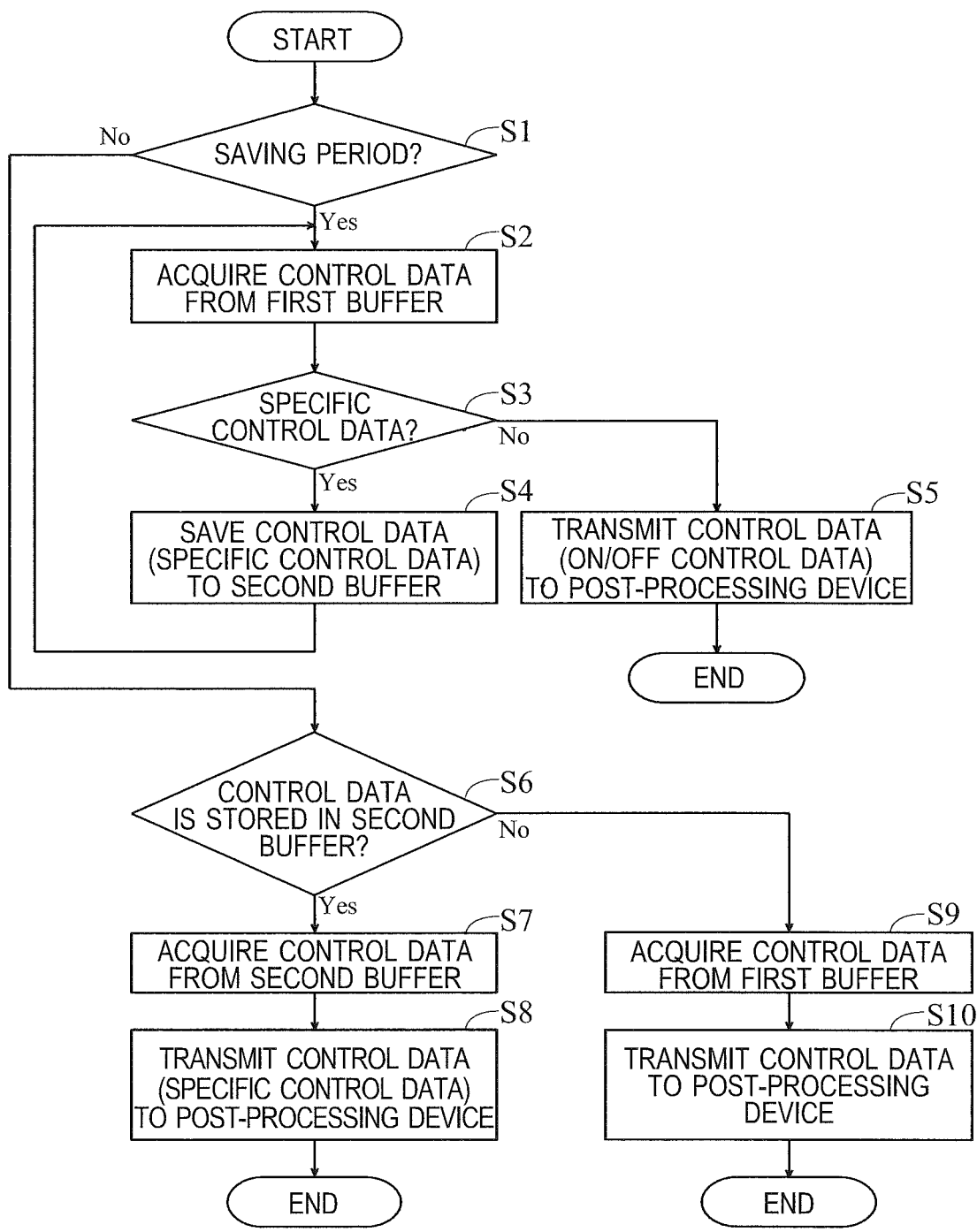
FIG. 5 is a flow chart showing a flow of a process performed when the control data is transmitted to the post-processing device by the main body CPU of the image forming apparatus according to one embodiment of the present disclosure.

With reference to a flow chart shown in FIG. 5, the following describes a flow of a process performed by the main body CPU 11 at the time of transmitting control data to the post-processing device 2. The flow chart shown in FIG. 5 starts at arrival of prescribed timing (timing at which transmission of control data to the post-processing device 2 is enabled).

At Step S1, the main body CPU 11 determines whether or not the saving period is underway. In a case where, as a result, the main body CPU 11 determines that the saving period is underway, a transition is made to Step S2. Upon the transition to Step S2, the main body CPU 11 acquires control data from the first buffer 15.

At Step S3, the main body CPU 11 determines whether or not the control data acquired from the first buffer 15 is the specific control data. In a case where, as a result, the main body CPU 11 determines that the control data is the specific control data, a transition is made to Step S4. Upon the transition to Step S4, the main body CPU 11 saves (stores) the control data (the specific control data) acquired from the first buffer 15 to the second buffer 16. After that, a transition is made to Step S2.

In a case where, at Step S3, the main body CPU 11 determines that the control data acquired from the first buffer 15 is not the specific control data (but the on/off control data), a transition is made to Step S5. Upon the transition to Step S5, the main body CPU 11 transmits the control data (the on/off control data) acquired from the first buffer 15 to the post-processing device 2.

In a case where, at Step S1, the main body CPU 11 determines that the saving period is not underway, a transition is made to Step S6. Upon the transition to Step S6, the main body CPU 11 determines whether or not any control data is stored in the second buffer 16. In a case where, as a result, the main body CPU 11 determines that control data is stored in the second buffer 16, a transition is made to Step S7.

Upon the transition to Step S7, the main body CPU 11 acquires the control data from the second buffer 16. The control data acquired by the main body CPU 11 at this time is the specific control data. After that, a transition is made to Step S8, where the main body CPU 11 transmits the control data (the specific control data) acquired from the second buffer 16 to the post-processing device 2.

In a case where, at Step S6, the main body CPU 11 determines that no control data is stored in the second buffer 16, a transition is made to Step S9. Upon the transition to Step S9, the main body CPU 11 acquires control data from the first buffer 15. The control data acquired by the main body CPU 11 at this time may be the on/off control data or the specific control data. After that, a transition is made to Step S10, where the main body CPU 11 transmits the control data acquired from the first buffer 15 to the post-processing device 2.

Figure 6:
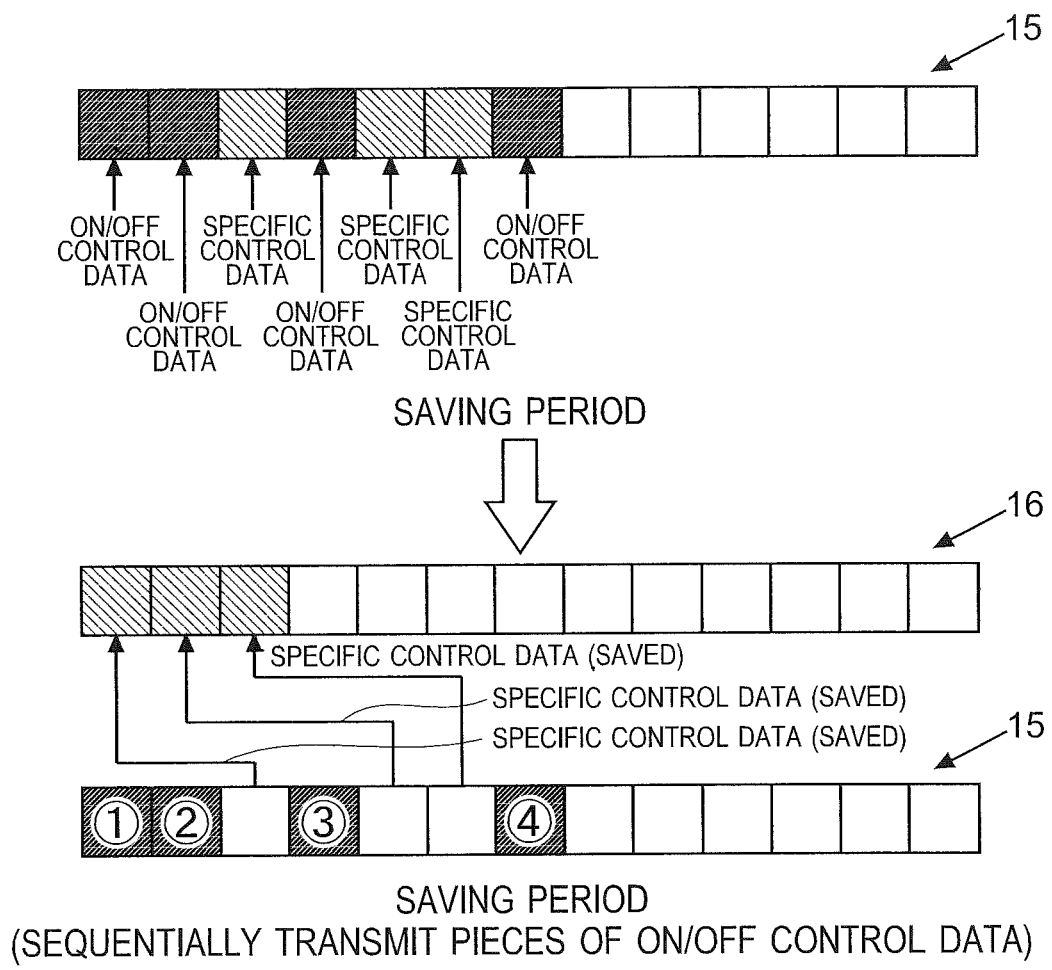
FIG. 6 is a view for explaining a saving process performed by the main body CPU of the image forming apparatus according to one embodiment of the present disclosure.

For example, it is assumed that, as shown in an upper illustration in FIG. 6, in the saving period, seven pieces of control data (including three pieces of specific control data) are stored in the first buffer 15. In this case, as shown in a lower illustration in FIG. 6, among the seven pieces of control data, the three pieces of specific control data are saved to the second buffer 16. Further, among the seven pieces of control data, remaining four pieces of on/off control data are sequentially transmitted from the first buffer 15 to the post-processing device 2 (in the lower illustration in FIG. 6, numbers assigned to the pieces of control data indicate an order in which they are to be transmitted).

Furthermore, for example, it is assumed that, as shown in an upper illustration in FIG. 7, the saving period is ended in a state where three pieces of specific control data are stored in the second buffer 16 and four pieces of control data (herein, the on/off control data) are stored in the first buffer 15. In this case, as shown in a lower illustration in FIG. 7, the three pieces of specific control data stored in the second buffer 16 are sequentially transmitted to the post-processing device 2, and then the four pieces of on/off control data stored in the first buffer 15 are sequentially transmitted to the post-processing device 2 (in the lower illustration in FIG. 7, numbers assigned to the pieces of control data indicate an order in which they are to be transferred).

As described above, the image forming apparatus 1 (the information processing apparatus) of this embodiment includes the post-processing device 2 (the optional device), the main body CPU 11 (the main body processing portion) that transmits control data for controlling the post-processing device 2 to the post-processing device 2, the first buffer 15 that primarily stores the control data to be transmitted to the post-processing device 2, and the second buffer 16. The post-processing device 2 includes the post-processing memory 22 (the optional memory). When brought into a state of not being able to retain the control data in the RAM of the post-processing memory 22 (a memory full state), the post-processing device 2 transmits a saving request to the main body CPU 11, and when brought into a state of being able to retain the control data in the RAM of the post-processing memory 22 (a state where the memory full state is resolved), the post-processing device 2 transmits a saving cancel request to the main body CPU 11. In a time period from the time of receipt of the saving request to the time of receipt of the saving cancel request, for the specific control data that is a type of control data required to be retained in the post-processing memory 22, the main body CPU 11 saves the specific control data from the first buffer 15 to the second buffer 16 without transmitting the specific control data to the post-processing device 2, while for any other type of control data than the specific control data, the main body CPU 11 transmits the any other type of control data from the first buffer 15 to the post-processing device 2 and, after receipt of the saving cancel request, transmits the specific control data, which has been saved to the second buffer 16, to the post-processing device 2.

In a configuration of this embodiment, when there is reached a memory full state of the RAM of the post-processing memory 22 (a state where control data cannot be retained in the RAM of the post-processing memory 22), a saving request is transmitted from the post-processing device 2 to the main body CPU 11, and when there is reached a state where the memory full state of the post-processing memory 22 is resolved (a state where control data can be retained in the RAM of the post-processing memory 22), a saving cancel request is transmitted from the post-processing device 2 to the main body CPU 11. In such a configuration in which a saving request and a saving cancel request are transmitted from the post-processing device 2 to the main body CPU 11, it is possible to make the main body CPU 11 recognize whether or not the post-processing memory 22 is in a memory full state.

When the post-processing memory 22 is in a memory full state (in a time period from the time of receipt of a saving request to the time of receipt of a saving cancel request), the main body CPU 11 saves the specific control data from the first buffer 15 to the second buffer 16, the specific control data being a type of control data required to be retained in the post-processing memory 22, without transmitting it to the post-processing device 2. In a case where the specific control data is saved to the second buffer 16, after the memory full state of the post-processing memory 22 is resolved (after receipt of a saving cancel request), the main body CPU 11 transmits the specific control data, which has been saved to the second buffer 16, to the post-processing device 2. At this time, the memory full state of the post-processing memory 22 has been resolved, and thus control data transmitted from the main body CPU 11 to the post-processing device 2 is retained in the post-processing memory 22. This can suppress occurrence of the inconvenience in which even though a piece of specific control data has been transmitted from the main body CPU 11 to the post-processing device 2, a job is executed in a state where a setting based on said piece of specific control data has not been performed (a state where data leakage has occurred).

Furthermore, in this embodiment, upon receipt of a saving cancel request, the main body CPU 11 transmits all the specific control data, which has been saved to the second buffer 16, to the post-processing device 2 and then transmits control data stored in the first buffer 15 to the post-processing device 2. In this configuration, the specific control data, which has been saved to the second buffer 16, can be preferentially transmitted to the post-processing device 2.

Here, there are a plurality of types of specific control data such as the control data related to a linear velocity, the control data related to a sheet weight, the control data related to a sheet size, and the control data related to a discharge destination. In a case where there are such a plurality of types of specific control data, a preference order for pieces of the specific control data may be preset based on their respective types among the plurality of types.

In a case where a preference order is preset for pieces of specific control data, upon receipt of a saving cancel request from the post-processing CPU 21 (when the saving period is ended), the main body CPU 11 recognizes the preference order for the pieces of specific control data, which have been saved to the second buffer 16. Then, the main body CPU 11 transmits the pieces of specific control data, which have been saved to the second buffer 16, to the post-processing device 2 in a descending order of preference based on the preference order.

In this configuration, a preference order is preset for pieces of specific control data of a plurality of types, and thus when the saving period is ended, it is possible to transmit the pieces of specific control data, which have been saved to the second buffer 16, to the post-processing device 2 in an order from a higher degree of preference.

Furthermore, among pieces of specific control data, which have been saved to the second buffer 16, an unnecessary piece(s) of specific control data may be erased (abandoned) from the second buffer 16 without being transmitted.

As one example, upon receipt of a saving cancel request from the post-processing CPU 21 (when the saving period is ended), the main body CPU 11 determines whether or not same-type data has been saved to the second buffer 16, the same-type data being the same type of specific control data as a type of specific control data stored in the first buffer 15. Upon determining that the same-type data has been saved to the second buffer 16, the main body CPU 11 erases the same-type data, which has been saved to the second buffer 16, from the second buffer 16 without transmitting it to the post-processing device 2.

In a case where a new piece of specific control data is stored in the first buffer 15 when and after the main body CPU 11 has received a saving cancel request from the post-processing CPU 21 and before the main body CPU 11 transmits the specific control data from the second buffer 16 to the post-processing device 2, there may be reached a state where the same-type data (a piece of specific control data of the same type as the new piece of specific control data) has been saved to the second buffer 16.

In this configuration, when a piece of specific control data of the same type as another piece of specific control data stored in the first buffer 15 has been saved to the second buffer 16, said piece of specific control data can be erased from the second buffer 16. That is, among pieces of specific control data of the same type, an older piece of specific control data (an unnecessary piece of specific control data) can be prevented from being transmitted to the post-processing device 2.

As another example, upon receipt of a saving cancel request from the post-processing CPU 21 (when the saving period is ended), the main body CPU 11 determines whether or not a preset erasure condition is met. For example, upon receipt of an erasure request together with a saving cancel request from the post-processing CPU 21, the main body CPU 11 determines that the erasure condition is met. Upon determining that the erasure condition is met, the main body CPU 11 erases the specific control data, which has been saved to the second buffer 16, from the second buffer 16 without transmitting it to the post-processing device 2. In this case, only control data stored in the first buffer 15 is transmitted to the post-processing device 2.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

For example, while the foregoing embodiment has described an example in which the present disclosure is applied at the time of transmission of control data to a post-processing device, the present disclosure is not limited thereto. When any other type of optional device such as a paper feed device is mounted in the image forming apparatus, the present disclosure is applicable at the time of transmission of control data to said optional device.

What is claimed is:

1. An information processing apparatus, comprising:
   an optional device;
   a main body processing portion that transmits control data for controlling the optional device to the optional device;
   a first buffer that primarily stores the control data to be transmitted to the optional device; and
   a second buffer,
   wherein
   the optional device includes an optional memory,
   when brought into a state where the control data cannot be retained in the optional memory, the optional device transmits a saving request to the main body processing portion, and when brought into a state where the control data can be retained in the optional memory, the optional device transmits a saving cancel request to the main body processing portion, and
   in a time period from the time of receipt of the saving request to the time of receipt of the saving cancel request, for specific control data that is a type of the control data required to be retained in the optional memory, the main body processing portion saves the specific control data from the first buffer to the second buffer without transmitting the specific control data to the optional device, while for any other type of the control data than the specific control data, the main body processing portion transmits the any other type of the control data from the first buffer to the optional device and, after receipt of the saving cancel request, transmits the specific control data, which has been saved to the second buffer, to the optional device.

2. The information processing apparatus according to claim 1, wherein
upon receipt of the saving cancel request, the main body processing portion transmits all the specific control data, which has been saved to the second buffer, to the optional device and then transmits the control data stored in the first buffer to the optional device.

3. The information processing apparatus according to claim 1, wherein
the specific control data comprises a plurality of types of specific control data,
a preference order for pieces of the specific control data is preset based on their respective types among the plurality of types,
upon receipt of the saving cancel request, the main body processing portion recognizes the preference order for the pieces of the specific control data, which have been saved to the second buffer, and transmits the pieces of the specific control data, which have been saved to the second buffer, to the optional device in a descending order of preference based on the preference order.

4. The information processing apparatus according to claim 1, wherein
upon receipt of the saving cancel request, the main body processing portion determines whether or not same-type data has been saved to the second buffer, the same-type data being a same type of the specific control data as a type of the control data stored in the first buffer, and in a case where the same-type data has been saved to the second buffer, the main body processing portion erases the same-type data, which has been saved to the second buffer, without transmitting the same-type data.

5. The information processing apparatus according to claim 1, wherein
upon receipt of the saving cancel request, the main body processing portion determines whether or not a preset erasure condition is met, and upon determining that the erasure condition is met, the main body processing portion erases the specific control data, which has been saved to the second buffer, without transmitting the specific control data.

* * * * *